(No Model.)
O. M. KIRLIN.
VEHICLE BRAKE.
No. 564,019. Patented July 14, 1896.
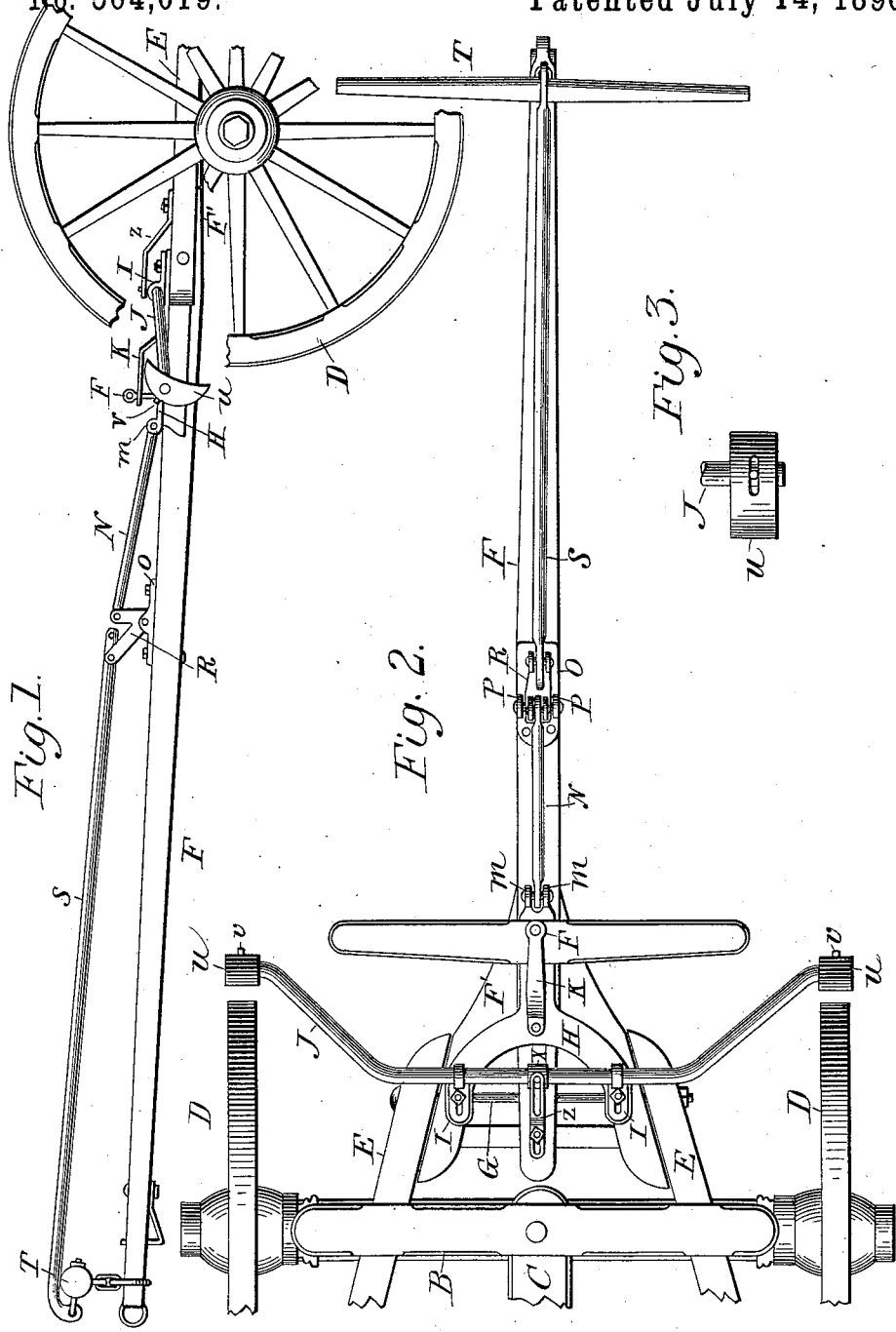
Witnesses:
W. J. Gray
A. M. Frazee
Inventor.
Otis M. Kirlin

UNITED STATES PATENT OFFICE.

OTIS M. KIRLIN, OF FARGO, NORTH DAKOTA.

VEHICLE-BRAKE.

SPECIFICATION forming part of Letters Patent No. 564,019, dated July 14, 1896.

Application filed March 28, 1895. Serial No. 543,606. (No model.)

*To all whom it may concern:*

Be it known that I, OTIS M. KIRLIN, a citizen of the United States, residing at Fargo, in the county of Cass and State of North Dakota, have invented a new and useful Vehicle-Brake, of which the following is a specification.

My invention relates to improvements in vehicle-brakes, and is adapted to operate automatically.

The object is to provide a simple and inexpensive system of mechanism for attachment to a vehicle which operates to force the brake-shoes into frictional contact with the wheels upon forward pressure of the vehicle, as in descending a hill, and yet permits the vehicle to be backed without resistance from brake.

A further object is to provide suitable means whereby the brake mechanism may be readily adjusted to vehicles of different sizes.

With these objects in view my invention consists in the novel construction and peculiar combination and arrangement of parts, as will be hereinafter set forth, and pointed out in the claims.

In the accompanying drawings, Figure 1 is a longitudinal sectional view of that portion of a wagon embodying my invention. Fig. 2 is a top plan view of same. Fig. 3 is a front view of brake-shoe. Figs. 1 and 2 represent different views of the forward portion of a wagon running-gear to which my improved brake mechanism is attached.

Axle B, pivoted at center to forward end of reach C and carrying wheels D D, hounds E E, attached to top side of axle B, tongue F, having a broad inner end F', is inserted between forward ends of hounds E E and adapted to fit loosely therein, a pivot-bolt G passing transversely through the hounds and this broad end of tongue to pivotally connect these parts together. This broad end of tongue F serves to receive a Y or T shaped plate H, which is slidingly attached to the upper face of same, the forked or rear end of this plate being provided at its extremities with brackets I I, which are slotted or perforated to permit of adjustment where connected to plate H, outer ends of these brackets being perforated to loosely retain brake-bar J. A smaller plate K is attached near its rear end to top side of plate H, outer end of plate K being perforated to admit of reception of a pin, which thence passes through doubletrees and into plate H, to which pin attaches or may extend into a slot in tongue underneath plate. A sliding motion to plate H is permitted by having same connected to tongue by a bolt, head of which extends through a slot in plate H, or connection may be made in similar manner, as desired.

The forward end of plate H is bifurcated or provided with ears *m m* for the reception of rear end of rod or bar N, which is pivoted or hinged between said ears.

Attached to the upper face of tongue and forward of plate H is bracket O, same being bolted or otherwise firmly secured to tongue and having upwardly-extending ears P P, which are perforated and between which is pivoted at its lower extremity the V-shaped lever R. Lever R is preferably constructed V-shaped, though not necessarily so, as it may be a straight lever or other form, the term "V-shaped" being descriptive of the points of attachment to lever R, as shown in drawings. The shorter arm of lever R extends upward and rearward and is connected at its extremity to forward end of bar N. Longer arm of lever R extends upward and forward and is connected at its extremity to rear end of bar or rod S, this rear end of bar S having two or more perforations to adjustably connect to lever R, lever R being bifurcated at points of connection to bars N and S and adapted to pivot bars at these points, lever R being adapted to rock backward or forward upon sliding motion of either of these bars. Bar S extends forward, passing over spreading-bar T, and being curved slightly downward connects at forward end to spreading-bar by means of an eyebolt which passes through spreading-bar. This connection may also be made by a ball-and-socket joint or other form and without the curved end to bar S.

Bars N and S and brake-bar J are preferably constructed of light and strong metal tubing, though not necessarily so.

Brake-bar J, carrying shoes *u u* at its outer ends, is securely attached to plate H by passing through perforations in brackets I I, being retained by pins or collars and set-screws on brake-bar at inner or outer sides of brackets, said brackets being located to rear of a line drawn between the peripheries of wheels and across tongue, and brake-bar being bent forward and outward, as required to bring brake-shoes u u into frictional contact with wheels when in operation.

Brake-shoes u u are of any desired form, but preferably constructed with a concave inner surface to correspond with periphery of wheels with which they come in contact, shoes being loosely attached to brake-bar by ends of same passing through them at a point slightly above their centers, thereby permitting shoes to assume a nearly perpendicular position when not in contact with wheels, shoes being prevented from sliding on bar by means of pins v v, which are screwed into brake-bar through slots in shoes, as shown in drawings. This pin is arranged by means of several holes in brake-bar to permit of lateral adjustment of shoes on same.

Attached adjustably to center of brake-bar is a collar x, having a set-screw or other projection at its top side, said projection being adapted to extend through a slot in forward end of bracket Z, coming in contact with forward end of slot when brake-bar is moved forward and tending to partially rotate same, rear end of bracket Z being adjustably secured to tongue in rear of brake-bar.

The brake mechanism being thus constructed and arranged operates as follows: Doubletrees being attached to plate H, draft tends to draw this plate forward as far as permitted by slot or other retaining device, this forward movement of plate forcing forward bars N and S and brake-bar J. This forward movement of brake-bar J brings the set-screw or projection on collar x in contact with forward end of slot in bracket Z, which tends to partially rotate brake-bar H, thereby moving brake-shoes forward and upward and free from contact with wheels. Upon forward pressure of vehicle, as in descending a hill, the spreading-bar forces bars N and S backward, pressure of bar N, through its attachment to plate H, carrying brake-bar J, forcing brake-shoes into frictional contact with wheels. Upon forward pressure of vehicle ceasing and draft being again applied through whiffletrees this rear movement of brake mechanism is reversed and it assumes its normal position with brake-shoes free from contact with wheels. As will be noted by reference to the drawings, the peculiar shape of lever R adapts it upon backward pressure of bar S to exert an increasing leverage upon bar N, thus rendering it possible to apply great pressure of brake-shoes against wheels with but slight backward pressure of bar S. When brake-shoes are forced into contact with wheels, contact being at a point considerably below that of nearest point to line upon which brake-bar is attached to plate, it is obvious that shoes will be retained in this position by frictional contact with wheels turning forward, but upon reverse motion, as in backing, the shoes will be carried upward toward a point where peripheries of wheels are nearer the line upon which brake-bar is attached to plate, and backward pressure upon brake-bar being checked by shorter arm of lever R coming in contact with rear end of bracket O, pressure of shoes upon wheels ceases, permitting wagon to be backed without resistance from brake.

It is manifest that various changes might be made in the constructive details of my invention without departing from the spirit thereof or exceeding its scope. Hence I do not wish to limit myself to the exact details of construction shown and described, but—

Having fully described my invention, what I wish to claim as new, and desire to secure by Letters Patent, is—

1. The combination with a vehicle-tongue and spreading-bar, of a plate slidingly attached to said tongue, said plate carrying evener upon forward end and brake-bar at rear end and connected to spreading-bar by means of rods and lever mechanism and adapted to move in unison therewith, connection of plate to spreading-bar being made by means of rods with intervening lever above tongue, forward end of outer rod passing above spreading-bar, thence being curved downward and attached to same by means of an eyebolt; lever of rod and lever device being adapted to provide great leverage and having a rocking movement through being pivotally connected to a bracket firmly secured to tongue, all substantially as set forth.

2. The combination with a vehicle-tongue and plate slidingly attached thereto, of a brake-bar loosely attached to said plate by means of brackets adjustably secured to same, said brake-bar carrying shoes at its outer ends, said shoes being laterally adjustable and pivotally attached to brake-bar in such manner as to assume a parallel position to peripheries of wheels with which they are adapted to come in contact, said brake-bar being adapted to permit of vehicle being backed without resistance from brake, all substantially as set forth.

3. The combination with a vehicle-tongue and plate slidingly attached thereto, said plate carrying a brake-bar, of a collar securely attached to brake-bar and having a set-screw or other projection, of a plate or bracket adjustably attached to tongue and adapted to engage projection on collar to partially rotate brake-bar for the purpose of retaining brake-shoes from contact with wheels, substantially as set forth.

OTIS M. KIRLIN.

Witnesses:
SAMUEL KIRLIN,
STEWART WILSON.